United States Patent

Morris

[11] 4,028,252
[45] June 7, 1977

[54] ACCORDION FOLD FLAT PLATE DIALYZER

[75] Inventor: Livingston B. Morris, Devon, Pa.

[73] Assignee: Extracorporeal Medical Specialties Inc., King of Prussia, Pa.

[22] Filed: June 4, 1975

[21] Appl. No.: 583,648

[52] U.S. Cl. .................. 210/321 B; 210/493 M; 264/257; 264/286

[51] Int. Cl.² .................................. B01D 31/00

[58] Field of Search ............ 210/321, 493 M; 264/257, 286

[56] References Cited

UNITED STATES PATENTS

| | | | |
|---|---|---|---|
| 3,442,388 | 5/1969 | Pall | 210/321 |
| 3,687,293 | 8/1972 | Carter | 210/321 |
| 3,757,955 | 9/1973 | Leonard | 210/321 |
| 3,864,265 | 2/1975 | Markley | 210/321 |
| 3,879,293 | 4/1975 | Wolf, Jr. et al. | 210/321 |

Primary Examiner—Frank A. Spear, Jr.
Attorney, Agent, or Firm—Connolly and Hutz

[57] ABSTRACT

A support material is fed through mating elements which emboss transverse score lines thereon to form an accordion fold in the material. A single thickness of the folded support material is then interleaved with a permeable membrane and sealed in a housing to form a compact inexpensive flat plate dialyzer. Longitudinal channels are formed in the support material which materially improve distribution of fluids within the dialyzer.

14 Claims, 7 Drawing Figures

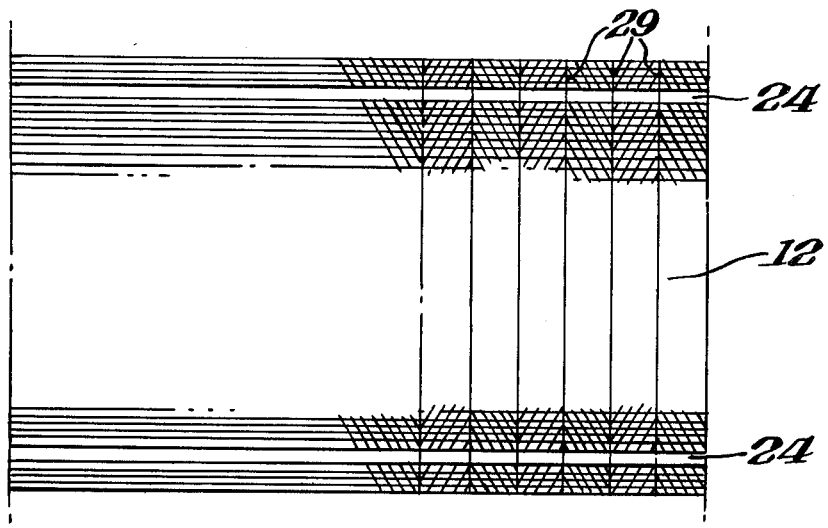
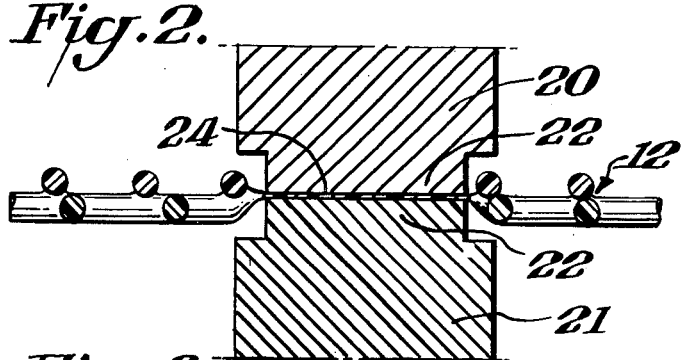
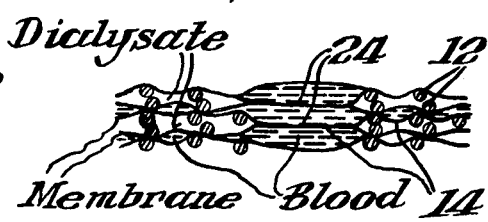
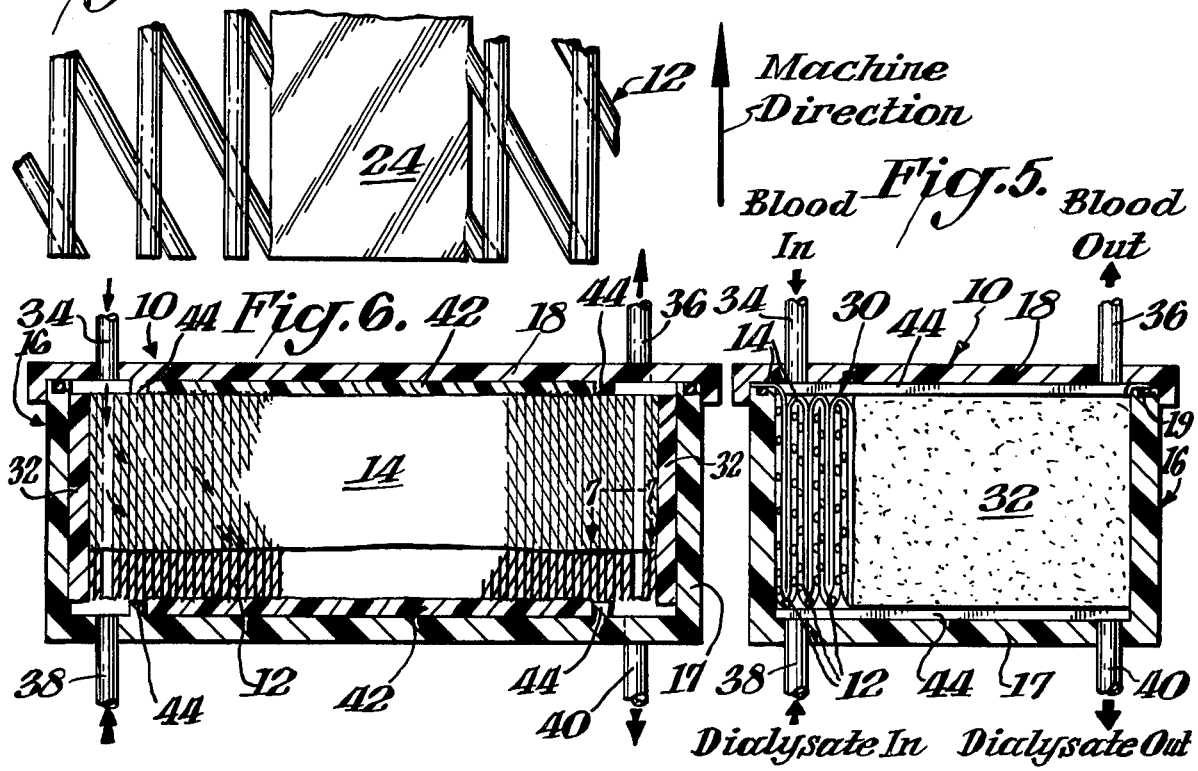

ACCORDION FOLD FLAT PLATE DIALYZER

BACKGROUND OF THE INVENTION

This invention relates to a flat plate dialyzer and method of making same and more particularly to a compact unit readily adaptable to mass production which has improved distribution of fluids therein.

Most prior art flat plate dialyzers are constructed of rigid support material interleaved with permeable membrane which are stacked and clamped together. Typical of this type of dialyzer are the devices illustrated in Esmond U.S. Pat. Nos. 3,585,131 and 3,738,495. These devices are bulky, difficult to assemble and because of the amount of plastic material used in them are not practical for disposal after use.

Attempts have been made to substitute the rigid support material of the Esmond U.S. Pat. Nos. 3,585,131 and 3,738,495 devices with flexible open weave support material such as illustrated in Leonard U.S. Pat. No. 3,757,955, Esmond U.S. Pat. No. 3,780,870 and Markley U.S. Pat. No. 3,788,482. A problem common to all of these devices, however, is inadequate distribution of fluids within the dialyzer, more particularly, distribution of fluid to the full depth of the device so the fluids will not shunt or shortcircuit the mass transfer area and go directly from the fluid inlet to the outlet. The Esmond U.S. Pat. No. 3,780,870 device discloses one approach to solving this problem, i.e., a complicated assemblage of support material having varying widths (reference numerals 14, 15 and 16 in FIG. 2 of Esmond). Another approach is disclosed in Leonard U.S. Pat. No. 3,757,955 which uses a stiff backing with stragetically located slots in it to promote distribution of fluids (FIG. 22; col. 9). All of these approaches, however, have the distinct disadvantage that they materially increase the cost of manufacture and do not lend themselves to automated assembly.

Other problems associated with use of flexible support material are the difficulty in sealing the permeable membrane within a housing so that there will be no leakage between the fluids (such as blood and dialysate) on opposite sides of the membrane and excessive bulk created when the support material is folded. Markley U.S. Pat. No. 3,788,482 attacks the first problem by embedding the leading and trailing edge of the membrane in an inner housing of epoxy (reference numeral 14 in FIG. 2), but this also has the disadvantage of being impractical from a manufacturing standpoint. None of the prior art treats the problem of excessive bulk and in fact compounds the problem by using multiple layers of support material in each pleat (Esmond U.S. Pat. No. 3,780,870) and extra layers of backing material with the support material (Leonard U.S. Pat. No. 3,757,955).

SUMMARY OF THE INVENTION

This invention obviates the difficulties with prior art dialyzers such as described above and discloses an attractive low cost flat plate dialyzer and method of making same.

More particularly, this application discloses the simple but unobvious expedient of forming the core of a flat plate dialyzer from a single layer of support material without any backing material which is scored to form an accordion fold and then interleaved with permeable membrane to form a pleated stack which can be easily sealed in a housing. This invention also incorporates a unique means for promoting distribution of fluids within the dialyzer utilizing channels formed in the support material. The scoring and formation of the channels may be accomplished on a continuous basis by feeding untreated open mesh support material through heated pattern rolls or platens. The rolls or platens selectively thin out the material in a limited area thus forming a path of lessened resistence to fluid flow which materially assists distribution of fluids within applicant's dialyzer.

Applicant's housing surrounding the pleated stack of membrane and support material comprises two mating members with a seal along at least two edges of one of the members. The leading and trailing edges of the permeable membrane are placed across this seal and sealed in the housing when the mating members of the housing are assembled.

DETAILED DESCRIPTION OF THE DRAWINGS

FIG. 2 is a partial cross-sectional view taken along line 2—2 of FIG. 1 illustrating the formation of a channel in the support material of this invention;

FIG. 3 is a fragmental top plan view of the support material and a channel formed therein;

FIG. 4 is a plan view illustrating a length of the support material and the score lines and channels formed therein;

FIG. 5 is a side cross-sectional view through the flat plate dialyzer illustrating the accordian support material and permeable membrane.

FIG. 6 is an end cross-sectional elevation of the flat plate dialyzer of FIG. 5, and FIG. 7 is a cross-sectional view taken along line 7—7 of FIG. 6 illustrating the channeled support material and membrane as used to direct the flow of blood and dialysate.

DETAILED DESCRIPTION OF THE PREFERRED EMBODIMENT

Figure 1:
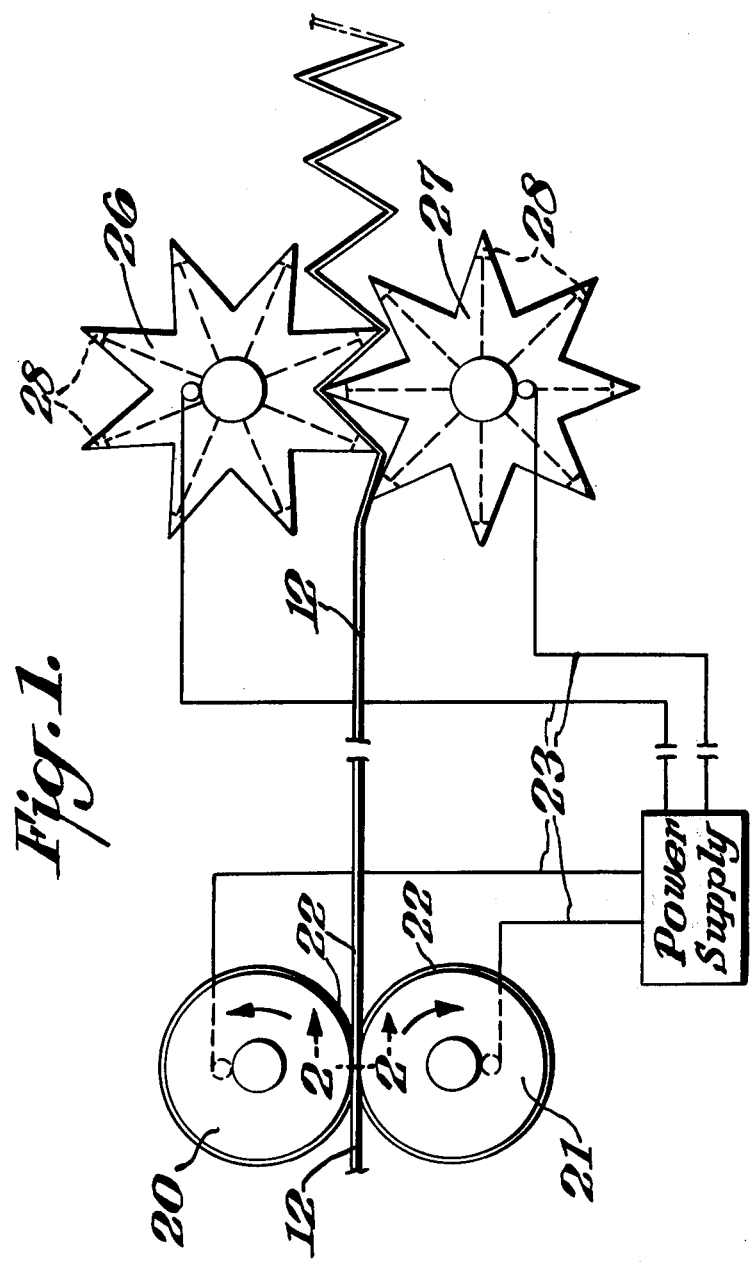
FIG. 1 is a diagrammatic view illustrating a method and apparatus for imparting an accordian fold in support material for use in this invention.

The flat plate dialyzer 10 of this invention includes support material 12 formed in an accordian fold and interleaved with permeable membrane sheet 14 to form a pleated stack which is sealed in a housing 16 to form a readily assembled, inexpensive throw-away dialysis unit. The permeable membrane material 14 can be Cuprophran PT-105 (a trademark of Enka Glanstoff, West Wuppertal, Germany, for regenerated cellulose dialysis material) or similar material. The support material 12 may be any flexible open mesh material capable of being deformed by the combination of heat and pressure.

Preferably the support material has a mesh pattern similar to that illustrated in FIG. 3, i.e., with strands running longitudinally (machine direction) crossed by other strands at a 30°–45° angle. Support material having this alignment of strands is sold by du Pont Co. of Wilmington, Del. under the tradename VEXAR. This type of support material has the unique advantage of nesting together when folded upon itself thus reducing the overall thickness and decreasing the compressive compliance of the pleated stack.

The first step in the method of manufacturing applicant's device is illustrated in FIG. 1 which shows support material 12 passing through a first set of rollers 20 and 21 which have heated raised ridges 22 near the ends thereof. These ridges 22 are heated to a temperature sufficient to plasticly deform support material 12 as shown in FIG. 2 so that a thinned out channel 24 is formed parallel and close to the edges of the support material (FIG. 4).

After passing through the rolls 20 and 21 the support material travels on to another set of mating rolls 26 and 27 which have heated tips 28. As support material 12 passes through rolls 26 and 27 the heated tips 28 of these rolls impart score lines 29 on the support material 12 which produces an accordian fold as illustrated in FIG. 1. The next step in applicant's method of making a flat plate dialyzer is to interleave membrane material 14 with the folded support material 12 to form a pleated stack 30.

The pleated stack 30 is then placed in a housing 16 which comprises two members, a U-shaped base 17 and mating cap 18. At least two upper edges of the base 17 contain a groove into which is inserted a suitable gasket or sealing material 19. The cap 18 is then snap fit or otherwise secured to the base 17 to compress seal 19 and thereby render the interface between base 17 and cap 18 fluid tight. In a preferred embodiment of applicant's invention, the leading and trailing edges of the permeable membrane 14 are placed over the seal 19 before the cap 18 is placed on the base 17 thus sealing these two edges of the permeable membrane 14.

The balance of the pleated stack 30 is sealed in housing 16 using a suitable biocompatible sealing material 32 such as epoxy or resin on the open ends of the pleated stack. The sealing material 32 is preferably placed in the housing 16 by centrifugal casting.

The flow paths of blood and dialysate through the dialyzer 10 after assembly of all parts are illustrated in FIGS. 5 and 6. As shown in these figures, the permeable membrane 14 separates the dialyzer 10 to two sections, one on each side of the membrane. Since the leading and trailing edges of membrane 14 as well as the sides of membrane 14 are sealed within the housing there can be no transfer of blood to dialysate and vice versa except through the membrane 14.

Blood flows into the dialyzer 10 through blood inlet 34 which is aligned with the channels 24 formed in support material 12 (FIG. 6). As illustrated in FIG. 7 the blood follows the path of least resistance through the elliptical tubes formed by the expansion of the permeable membrane against the channels 24 formed in support material 12 and thus is distributed to the full depth, top to bottom, of housing 16 before it starts its travel across the housing to the blood outlet 36. Because the blood is at a higher pressure than the dialysate the permeable membrane 14 will expand in a balloon-like fashion into the channels 24 formed in the support material thus facilitating the aforementioned flow of blood to the full depth of the housing 16 (FIG. 7). As illustrated in FIG. 6 when the blood flows into the pleated stack 30 some of it will start to course downward along the slanted ribs of the support material 12 until it reaches the bottom of the housing and then starts to course back upward following the pattern of the support material. This assures adequate distribution of the blood throughout the entire pleated stack. The channels 24 also materially assist the flow of dialysate through the housing 16 since the dialysate inlet 38 and outlet 40 are similarly aligned with the channels 24 but on the opposite side of the membrane 14.

The pleated stack 30 should be so configured that it is slightly compressed when placed in housing 16 in order to minimize shunting of blood or dialysate along the wall of the housing 16 between inlets and outlets. Alternatively, a suitable biocompatible resin or epoxy material 42 may be placed between the housing 16 and pleated stack 30 in the area between the respective inlets and outlets to prevent such shunting and force the respective fluids through the pleated stack 30. To prevent the resin or epoxy 42 from spreading into the inlet or outlet areas suitable dams 44 may be formed in base 17 and/or cap 18.

I claim:

1. A flat plate dialyzer comprising a housing having separate inlets and outlets therein for blood and dialysate, a single continuous layer of flexible, nonwoven support material, said support material accordian folded along transverse score lines formed in the support material, a pattern on at least one side of said support material being oriented substantially perpendicular to the score lines whereby compaction of the support material is obtained by interdigitation of the pattern when accordian folded upon itself, a continuous layer of permeable membrane material placed within the accordian folds on one side of the support material to form a pleated stack and sealed in said housing to form separate flow paths for blood and dialysate on opposite sides of said membrane.

2. The flat plate dialyzer of claim 1 wherein the support material has longitudinal channels formed therein.

3. The flat plate dialyzer of claim 2, wherein said channels are aligned with the inlets and outlets in said housing to promote distribution of fluids within said housing.

4. The flat plate dialyzer of claim 2 wherein the channels in the support material are thinner than the support material.

5. The flat plate dialyzer of claim 1 wherein a biocompatable material is placed between the housing and pleated stack in an area between at least one of the inlets and outlets to prevent shunting of fluids between the inlet and outlet.

6. The flat plate dialyzer of claim 5 wherein the housing contains internal dams to prevent the biocompatible material from blocking the inlets or outlets.

7. The flat plate dialyzer of claim 1 wherein the housing comprises at least two mating parts.

8. The flat plate dialyzer of claim 7 wherein at least two edges of the permeable membrane are sealed between abutting portions of the mating parts of said housing.

9. The flat plate dialyzer of claim 8 wherein the other two edges of the permeable membrane are sealed in a biocompatible sealing material centrifugally cast in the ends of the housing.

10. The flat plate dialyzer of claim 8 wherein a compressible, strip sealing material is placed in a groove in one of the mating housing parts, two edges of the permeable membrane being sealed in the housing between the strip sealing material and the abutting edge of the other mating housing part.

11. A method of making a flat plate dialyzer comprising the steps of passing a continuous layer of flexible, non woven support material between mating elements to form transverse score lines therein and impart an accordian fold thereto, placing permeable membrane on one side of said scored support material, folding the support material along the score lines with the permeable membrane in place to form a pleated stack, placing the pleated stack in one of two mating housing parts, sealing at least two edges of the permeable membrane within said housing by compressing said edges between abutting portions of the mating housing parts, at least one of said abutting portions of the housing parts having a strip sealing material therein, sealing the remaining edges of the permeable membrane within the housing and securing the mating housing parts to each other at a location other than that at which the permeable membrane is sealed between abutting portions of the housing parts.

12. The method of making a flat plate dialyzer according to claim 11 wherein the mating elements are heated rolls.

13. The method of making a flat plate dialyzer according to claim 11 wherein the mating elements are platens.

14. The method of making a flat plate dialyzer according to claim 11 wherein the mating elements form longitudinal channels in the support material.

* * * * *